(12) United States Patent
Goodacre et al.

(10) Patent No.: US 7,640,491 B2
(45) Date of Patent: Dec. 29, 2009

(54) OUTPUTTING DYNAMIC LOCAL CONTENT ON MOBILE DEVICES

(75) Inventors: Anthony John Goodacre, Cambridge (GB); Barry Merrick, Sawston (GB); David Hitchman, Soham (GB)

(73) Assignee: Microsoft Corporation, Redmond, WA (US)

( * ) Notice: Subject to any disclaimer, the term of this patent is extended or adjusted under 35 U.S.C. 154(b) by 1450 days.

(21) Appl. No.: 10/010,190

(22) Filed: Dec. 5, 2001

(65) Prior Publication Data

US 2003/0106022 A1 Jun. 5, 2003

(51) Int. Cl.
*G06F 17/20* (2006.01)
(52) U.S. Cl. ...................................... 715/234; 715/235
(58) Field of Classification Search ............... 715/501.1, 715/513, 760, 234–236, 238, 243–245
See application file for complete search history.

(56) References Cited

U.S. PATENT DOCUMENTS

| | | | | |
|---|---|---|---|---|
| 5,835,914 A | * | 11/1998 | Brim | 707/206 |
| 5,987,480 A | * | 11/1999 | Donohue et al. | 715/501.1 |
| 6,012,087 A | * | 1/2000 | Freivald et al. | 709/218 |
| 6,023,714 A | * | 2/2000 | Hill et al. | 715/513 |
| 6,260,050 B1 | * | 7/2001 | Yost et al. | 715/501.1 |
| 6,300,947 B1 | * | 10/2001 | Kanevsky | 715/866 |
| 6,563,514 B1 | * | 5/2003 | Samar | 715/711 |
| 6,993,707 B2 | * | 1/2006 | Baker et al. | 715/500 |
| 7,117,262 B2 | * | 10/2006 | Bai et al. | 709/224 |
| 2002/0062264 A1 | * | 5/2002 | Knight | 705/26 |
| 2002/0143821 A1 | * | 10/2002 | Jakubowski | 707/522 |
| 2003/0046365 A1 | * | 3/2003 | Pfister et al. | 709/219 |
| 2003/0061106 A1 | * | 3/2003 | Orhomuru | 705/26 |
| 2003/0126136 A1 | * | 7/2003 | Omoigui | 707/10 |
| 2004/0015476 A1 | * | 1/2004 | Twaddle | 707/1 |

OTHER PUBLICATIONS

Lewis, R., Adobe PageMill 2.0 Handbook, Hayden Books (Dec. 1996, chapter 10).*
Lewis, R. , "Creating Web pages without learning HTML, Adobe Pagemill 2.0", Hayden Books, 1996, pp. 257-264.*
Data in Your Space [Wireless Access] M.H. Dunham et al., Proceedings Third International Workshop on Advanced Issues of E-Commerce and Web-Based Information Systems, WECWIS 2001, Publ by IEEE Comput. Soc , Los Alamitos, CA, USA, 2000 pp. 66-73.

* cited by examiner

*Primary Examiner*—C B Paula
(74) *Attorney, Agent, or Firm*—Workman Nydegger

(57) ABSTRACT

Automatically displaying updated and relevant content on the display of a mobile computing device. In response to receiving a registration that includes a request for particular dynamic content, a subscription service creates a template file. The template file includes static content, references to dynamic content, and corresponding layout information. The template file is transferred to and stored on a mobile computing device. When dynamic content is updated the dynamic content is pushed to the mobile computing device via a push gateway. Dynamic content may be included in an service indication message that is pushed to the mobile computing device via a wireless protocol. Dynamic content may be stored in an update store included in the mobile computing device. At an appropriate time computer-executable instructions may be executed that merge content from the update store into the template file for display on a display device.

48 Claims, 4 Drawing Sheets

OUTPUTTING DYNAMIC LOCAL CONTENT ON MOBILE DEVICES

BACKGROUND OF THE INVENTION

1. The Field of the Invention

The present invention relates to displaying content on mobile devices. More specifically, the present invention relates to systems, methods, and computer program products for automatically updating the display of relevant content on a local mobile device when the relevant content changes at a remote device.

2. Background and Relevant Art

Users of mobile computing devices, such as cellular phones, pagers, and personal digital assistants ("PDAs") often have access to large quantities of displayable content. For example, portions of content included in the World Wide Web are viewable on mobile computing devices. Additionally, mobile computing devices may display, via a browse based connection, proprietary content, such as stock quotes, sports scores, and headline news from other subscription-based services. A mobile computing device may also receive static text messages in the form of Short Message Service ("SMS") messages that are stored in an inbox. Users of mobile computing devices may also use such devices to store personal information, such as appointments, calendars, contact lists, instant messages, and electronic mail messages.

Although the display area available for displaying content on mobile computing devices is small when compared to standard monitors, the display area continues to increase. Thus, users of mobile computing devices have the ability to view content from a variety of different sources simultaneously. While simultaneously displaying larger amounts of content is beneficial to users, there are problems inherent in current technology that may hinder users from efficiently displaying relevant content.

Conventional methods for mobile devices to view content often require a user to "go and get" the content they want. A user may do this by dialing into a network or using a permanent connection to browse through a series of menus or Uniform Resource Identifiers ("URIs") in order to locate relevant content. Dialing into a network requires some amount of time for communication protocols to be initialized before a user may view content. Furthermore, there are often latency delays between the time a URI is selected and the time the corresponding information is retrieved. Additionally, there is often lower data transmission rates associated with wireless communication. Thus, when considering these delays, displaying relevant content using a wireless device may become time-consuming to a user of the wireless device.

Another problem in displaying relevant information results when mobile computing devices are pre-configured with a single display format. Many users do not wish to view the same data. For example, one user may wish to view continuous stock quotes and headline news, while a second user wishes to view sports scores and messages notifying them of the receipt of electronic mail. Furthermore, even the same user may wish to view different data at different times, perhaps viewing stock quotes at work and sports scores at home.

Users requesting different types of content may desire to be informed when relevant content changes. However, many data generating applications do not send notification of updates. When data-generating applications do not send notification, a mobile device has no way to know an update has occurred. As a result, a user of a mobile device may not be aware of updated content. In addition to receiving notification of updated content, users may also desire to automatically have updated content displayed on a mobile device. However as previously stated, current browsing technologies limit this capability, as a user must often browse a series of URIs to locate relevant information.

Therefore, what are desired are systems, methods, and computer program products for automatically updating the display of a mobile device when relevant content changes.

BRIEF SUMMARY OF THE INVENTION

The principles of the present invention provide for automatically updating the display of a mobile device when dynamic data of interest to the mobile device changes. Dynamic data of interest may include displayable dynamic content as well as layout information that describes how displayable dynamic content is to be displayed. To receive automatic updates when displayable dynamic content or layout information changes, a mobile device may register with a subscription service. The registration may include a request for specific displayable dynamic content that will be displayed in a specific format. In response to receiving a registration, the subscription service may transfer a template file to the mobile device. The template file may include static content, references to displayable dynamic content, and layout information.

In operation, a template file facilitates the display of static and displayable dynamic content in a format that was requested by a user of a mobile device. When a subscription service receives a registration, it may store the registration. An information delivery service may monitor stored registrations for a mobile device. When displayable dynamic content relevant to the mobile device changes, the displayable dynamic content may be transferred from a remote source to an update store included in the mobile device. At an appropriate time, computer-executable instructions may be execute which cause content in the update store to be merged with a template file.

In one embodiment, static content and references to displayable dynamic content are combined in a Multipurpose Internet Mail Exchange ("MIME") encoded file. Static content may include text, graphics, Uniform Resource Identifiers ("URIs"), and markup language commands, such as those associated with Hypertext Markup Language ("HTML") or Extensible Markup Language ("XML"). References to displayable dynamic content may include macro extensions to HTML, XML or some other markup language, that when expanded, may facilitate the display of displayable dynamic content on a display device.

Computer-executable instructions may also be generated, that when executed, cause displayable dynamic content to be merged with static content. When displayable dynamic content is merged, it is displayed in an appropriate location on a display device. The template file, as well as, the computer-executable instructions are transferred to the mobile device that registered to receive updated content.

The subscription service may notify an information delivery service of dynamic data of interest to the mobile device. The information delivery service may track service registrations for mobile devices. When dynamic data of interest to a mobile device is updated, for example, displayable dynamic content or layout information, the information delivery service may facilitate transmission of the updated dynamic data to the mobile device.

A mobile device may store a received template file. When displayable dynamic content referenced in the template file is updated, the mobile device may receive a notification. This notification may be in the form of a service indication message that is sent to the mobile device via the Wireless Application Protocol ("WAP"). The service indication message may include displayable dynamic content, as well as a reference to a portion of layout information included in a template file that was previously stored in the mobile device. Displayable dynamic content associated with the service indication message may be stored in an update store included in the mobile device.

At an appropriate time, computer-executable instructions may be executed that cause displayable dynamic content stored in the update store to be merged with a template file and displayed on a display device. Since the displayable dynamic content is content the mobile device registered to receive, there is an increased chance the content will be relevant to the mobile device. Displayable dynamic content may include links to other relevant content, which are displayed in a manner that reduces the chance that a user will have to follow multiple URIs to access the other relevant content.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and computer program products for updating the display of dynamic data, for example, displayable dynamic content or layout information, on the display of a mobile device. A mobile device may register with a subscription service; the registration denotes displayable dynamic content and layout information that is of interest to the mobile device. In response to the registration, the subscription service may transfer a template file to the mobile device. The template file may include layout information for displaying static content, as well as the current displayable dynamic content, on a display device associated with the mobile device.

An information delivery service may monitor content denoted in a registration. When displayable dynamic content of interest changes, the changed displayable dynamic content may be transported to an update store include in the mobile device. At an appropriate time, displayable dynamic content in the update store may be merged with layout information included in a template file in order to display content in an appropriate location on a display device.

Embodiments of the present invention may comprise a special-purpose or general-purpose computing device that various computer hardware components, as discussed in greater detail below. Embodiments within the scope of the present invention also include computer-readable media for carrying or having computer-executable instructions or data structures stored thereon. Such computer-readable media may be any available media, which is accessible by a general-purpose or special-purpose computer. By way of example, and not limitation, such computer-readable media can comprise physical storage media such as RAM, ROM, EPROM, CD-ROM or other optical disk storage, magnetic disk storage or other magnetic storage devices, or any other medium which can be used to carry or store desired program code means in the form of computer-executable instructions or data structures and which can be accessed by a general-purpose or special-purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general-purpose computer, special-purpose computer, or special-purpose processing device to perform a certain function or group of functions.

Figure 1A:
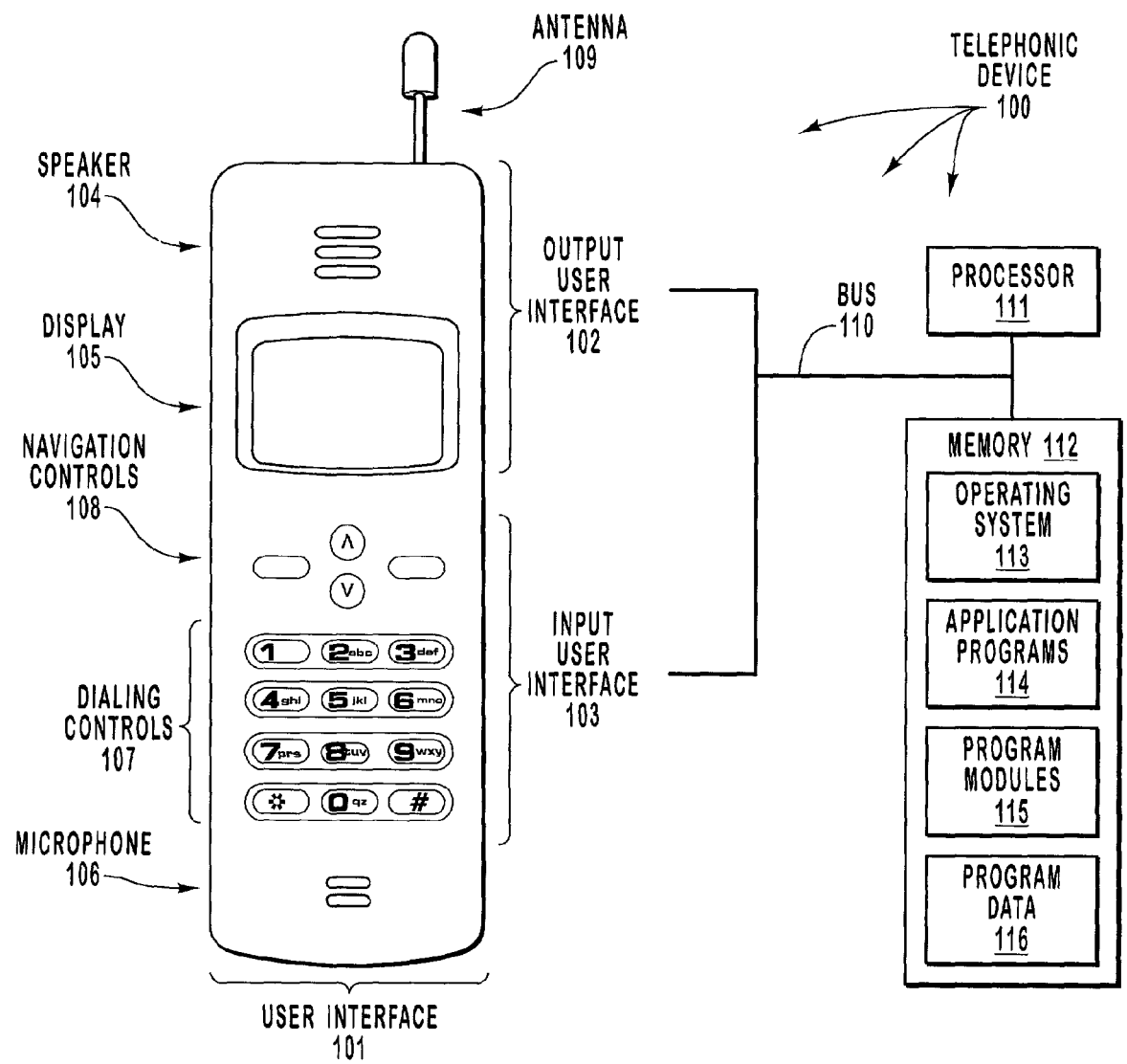
FIG. 1A illustrates an example mobile computing device that provides a suitable operating environment for the present invention.

FIG. 1A and the following discussion are intended to provide a brief, general description of a suitable computing environment in which the invention may be implemented. Although not required, the invention will be described in the general context of computer-executable instructions, such as program modules, being executed by computing devices. Generally, program modules include routines, programs, objects, components, data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices that are linked (either by hardwired links, wireless links, or by a combination of hardwired or wireless links) through a communications network perform tasks. In a distributed computing environment, program modules may be located in both local and remote memory storage devices.

Embodiments of the present invention may be practiced with general-purpose or special-purpose mobile computing devices. Mobile computing devices may transport data over wireless communication links and may be carried by a user from location to location. Types of mobile computing devices may include, mobile telephones, Personal Digital Assistants ("PDAs"), pagers, hand-held devices, laptop computers, or other devices typically associated with a mobile computing environment. With reference to FIG. 1A, a suitable operating environment for the principles of the invention includes a general-purpose computing device in the form of a telephonic device 100. The telephonic device 100 includes a user interface 101 for allowing a user to input information through an input user interface 103, and review information presented via an output user interface 102.

For example, the output user interface 102 includes a speaker 104 for presenting audio information to the user, as well as a display 105 for presenting visual information to the user, for example, displayable dynamic content. The telephonic device 100 may also have an antenna 109 if the telephonic device 100 has wireless capabilities.

The input user interface 103 may include a microphone 106 for rendering audio information into electronic form. In addition, the input user interface 103 includes dialing controls 107 represented by 12 buttons through which a user may enter information. Input user interface 103 also includes navigation control buttons 108 that assist the user in navigating through various entries and options listed on display 105.

Although the user interface 101 has the appearance of a mobile telephone, the unseen features of the user interface 101 may allow for complex and flexible general-purpose processing capabilities. For example, the telephonic device 100 also includes a processor 111 and a memory 112 that are connected to each other and to the user interface 101 via a bus 110. The memory 112 generically represents a wide variety of volatile and/or non-volatile memories that may be employed. The particular type of memory used in the telephonic device 100 is not important to the present invention.

Program code means comprising one or more program modules may be stored in memory 112. The one or more program modules may include an operating system 113, one or more application programs 114, other program modules 115, and program data 116.

While FIG. 1A represents a suitable operating environment for the present invention, the principles of the present invention may be employed in any device that is capable, with suitable modification if necessary, of implementing the principles of the present invention. The environment illustrated in FIG. 1A is illustrative only, and by no means represents even a small portion of the wide variety of environments in which the principles of the present invention may be implemented.

Figure 1B:
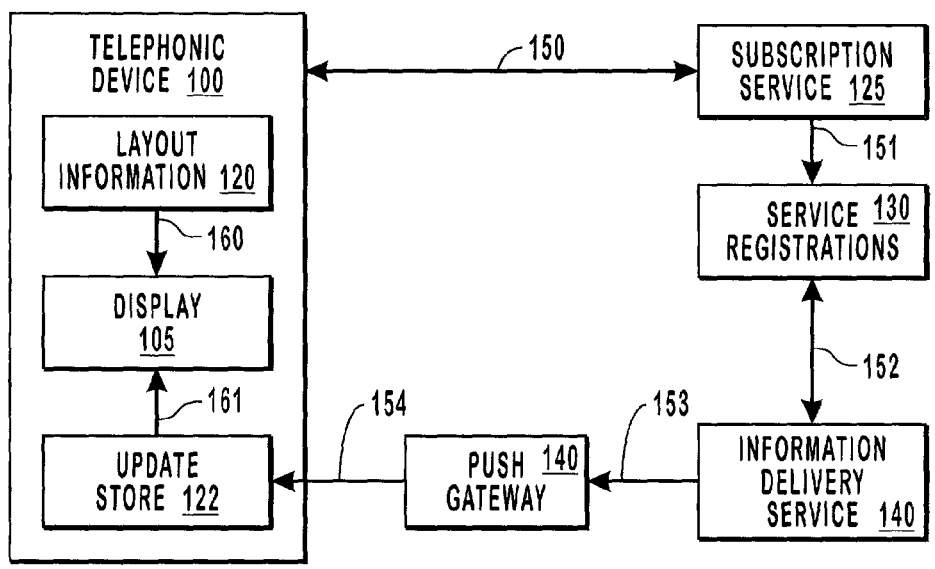
FIG. 1B illustrates an example network system that provides a suitable operating environment for the present invention.

FIG. 1B illustrates telephonic device 100 in communication with resources from which telephonic device 100 may receive dynamic data, for example, displayable dynamic content and/or layout information. Telephonic device 100 may communicate with subscription service 125 over wireless communication link 150. Subscription service 125 may include or may be included in a cellular or digital network used by telephonic device 100 for voice communications. Subscription service 125 may also include or be included in the Internet, other proprietary networks that generate content, or any combination thereof. When communicating over wireless communication link 150, telephonic device 100 may receive dynamic data from data generating locations included in subscription service 125, such as applications running at a cellular or digital service provider, an Internet service provider, or other proprietary networks. The dynamic data received by telephonic device 100 may include layout information or displayable content, for example, electronic messages, sports scores, news, or other content of interest to the user of telephonic device 100.

Telephonic device 100 may also receive dynamic data from information delivery service 140. It may be that information delivery service 140 includes or is included in a cellular or digital network used by telephonic device 100 for voice communications, the Internet, other proprietary networks that generate data, or any combination thereof. Data received from information delivery service 140 may be displayable dynamic content that was gathered from the Internet or from other proprietary services. Information delivery service 140 may transfer displayable dynamic content to push gateway 140 via communications link 153. Communications link 153 may be hardwired, wireless, or combinations thereof.

Telephonic device 100 may also include layout information 120 and update store 122. Layout information 120 may be a data structure or program module that defines how displayable dynamic content is to be displayed. Layout information 120 may be included in application programs 114, program modules 115, program data 116, or combinations thereof. Update store 122 may be a portion of memory 112 that is designated to store updates to dynamic data. Data that is stored in update store 122 may be included in program data 116.

FIG. 1B is merely illustrative of one embodiment in which the principles of the present invention may be practiced. Telephonic device 100 may be configured to receive dynamic data only from subscription service 125, only from information delivery service 140, or from both of these locations. Alternatively or in addition, dynamic data may be internally generated by one of the application programs 114 executed locally on the telephonic device 100. Additionally, it may be that telephonic device 100 is configured to receive dynamic data from other locations, either singly, or in combination with subscription service 125, information delivery service 140, or both subscription service 125 and information delivery service 140.

One type of dynamic data that telephonic device 100 may receive is a template file and corresponding layout information. Layout information may be previously created data that defines how displayable dynamic content received by telephonic device 100 is displayed on a display device. A template file and corresponding layout information may be created using a programming language. When instructions of the programming language included in a template file are executed at computing device, for example, telephonic device 100, either directly or after compiling, this may cause telephonic device 100 to display content according to a layout defined by the layout information. Layout information may be included in a template file. In alternate embodiments, it may also be that computer-executable instructions that cause content to be displayed are stored in telephonic device 100 before a template file and corresponding layout information are created.

One group of programming languages that may be used to create layout information are known as "markup languages." Markup languages are intended to be independent of any hardware or software and may be defined for any area of application. Some of the objectives of markup languages are separating "content and structure," identifying text objects generically, and using a formal grammar to structure relationships between coded text objects. As such, generating programs for displaying and arranging text is often substantially easier when using a markup language.

Many commercially used markup languages are based on the Standard Generalized Markup Language ("SGML"). SGML is not a programming language, but a "meta-language" used to define structural markup languages. The Hyper Text Markup Language ("HTML") is an example of a markup language that was designed using SGML. A complete definition of SGML is contained in international standard ISO 8879 "Information Processing—Text and Office Systems—Standard Generalized Markup Language (SGML)."

Markup languages typically use "tags," which are commands or instructions that specify how a document, or a portion of the document should be formatted. Extensible Markup Language ("XML") is a subset of SGML, designed specifically for interoperability with World Wide Web applications, which allows designers to create their own customized tags, thereby enabling definition, transmission, and interpretation of data between applications or computer systems XML. Thus, when using XML, a designer may create one or more customized tags that receive data associated with data generating applications.

Figure 2:
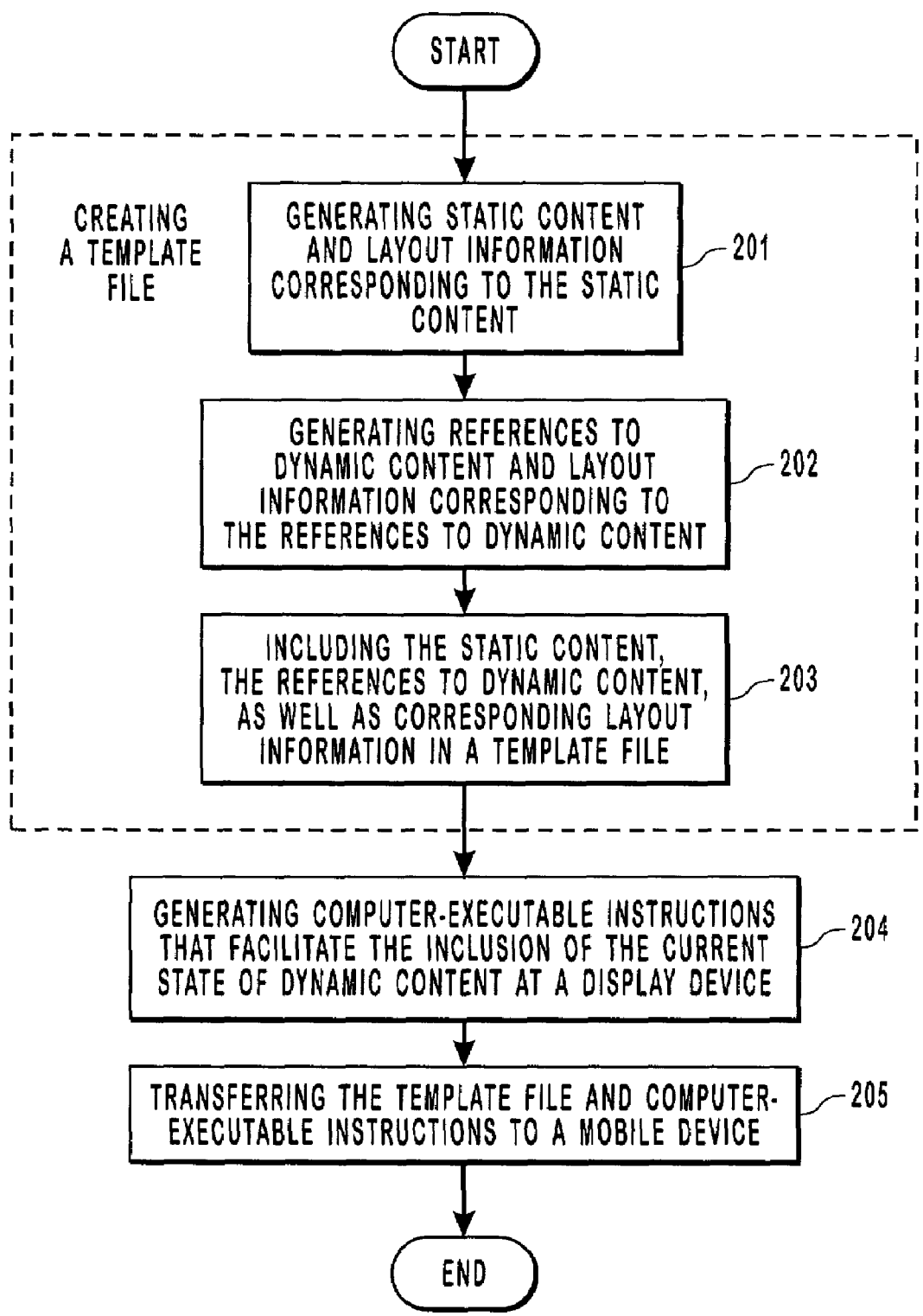
FIG. 2 is a flow diagram illustrating an example of a method for creating a template file that facilitates the automatic display of dynamic data.

The flow chart in FIG. 2 illustrates one method of creating a template file and corresponding layout information that facilitates the automatic display of displayable dynamic content. The method in FIG. 2 will be described with reference to the functional components and modules described in FIGS. 1A and 1B.

The method may include generating static content and layout information corresponding to the static content (act 201). Static content is content that will not change when displayed at a mobile device. Static content may include hard coded Uniform Resource Identifiers ("URIs"), graphics, audio tones, text that describes what is being displayed, such as the word "inbox," other text that does not change over time, or combinations thereof. It should be understood that these are only examples of static content. It would be obvious to one skilled in the art, after having reviewed this description, that a wide variety of types of static content exist.

Layout information corresponding to the static content may define what static content is to be displayed, how displayed static content is to be formatted, and where displayed static content is to be displayed on a display device. This may include determining a location on a display device, determining a character set, determining a font, determining a font size, determining a font color, manipulating graphics images, manipulating audio tones, rendering static content in an appropriate location on a display device, or otherwise formatting raw static content so as to personalize for display to a user. With reference to FIG. 1B this may include defining how static content will be formatted for display at display 105 or output at speaker 104. While static content will not change, layout information associated with the static content may change. Layout information associated with static content may change if an update in the arrangement or format of static content is desired. It should be understood that these are only examples of formatting static content. It would be obvious to one skilled in the art, after having reviewed this description, that a wide variety of techniques exist for formatting static content.

The method in FIG. 2 may also include an act of generating references to displayable dynamic content and layout information corresponding to the references to displayable dynamic content (act 202). References to displayable dynamic content may include macro extensions that are customized for operation with a programming language. This may include macro extensions to compiled languages, for example C++, as well as markup languages, for example, Hypertext Markup Language ("HTML"), Extensible Markup Language ("XML"), Handheld Device Markup Language ("HDML"), and Wireless Markup Language ("WML") and script languages, for example java script. However, implementation of the present invention is not limited to these specific languages. The present invention may be practiced with any language or extension of a language, which includes instructions that may facilitate access to the properties of objects.

These extensions, when included in a template file stored on a mobile device, may facilitate display of updated displayable dynamic content on display 105. In one embodiment, macro extensions may include variables. At the time updated displayable dynamic content is displayed, actual displayable dynamic content may be substituted for the variables. For example, the following sample of computer code includes HTML commands that illustrate how values may be substituted for variables during execution. The numbers included at the beginning of each line denote the line number of the corresponding line of code. The numbers are for reference purposes and do not represent code that would actually be executed.

```
1.  <!--Print today's top 3 headlines-->
2.  [$if:notify.siid.headlines$]
3.  <ul>
4.  [$endif:$]
5.
6.  [$for:notify.siid.headlines$]
7.  <li>[$notify.siid.headlines.text$]  
8.  <a href="$notify.siid.headlines.uri$">[more]</a>
9.  [$next:3$]
10.
11. [$if:notify.siid.headlines$]
12. </ul><hr>
13. [$endif:$]
```

The code sample illustrates a looping mechanism whereby three items are listed on a display device. Assume for purposes of describing this code sample, that displayable dynamic content in the form of at least three news headlines, is stored in update store 122. Line six of the code sample includes the text "$for:", and line nine includes the text "$next:3$". This essentially means that code included in lines seven and eight may be executed three times, or in the case where there are less than three displayable dynamic content items, executed for each of the available number of displayable dynamic content items.

The code sample beings with a comment line describing what will be displayed. Line two of the code sample includes the conditional statement "[$if:notify.siid.headlines$]." The variable "notify.siid.headlines" represents an object, if the represented instance of displayable dynamic content called headlines has a non-null value the "if" statement returns a TRUE. When an "if" statement returns a TRUE value, code included in the "if" statement is executed. In this example the "<ul>" command is executed, <ul> is an HTML command that denotes the beginning of an unordered list.

Figure 1C:
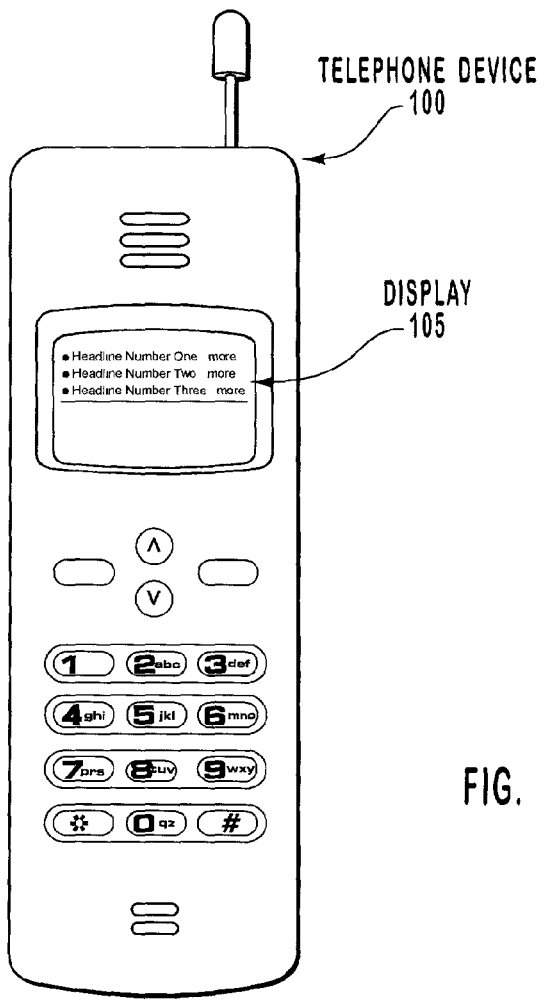
FIG. 1C illustrates an example of a mobile computing device displaying dynamic data.

Execution of commands may then proceed to the "for" loop. The seventh line of the code sample includes the "<li>" command. The <li> command may cause the display of a bullet, "•," on display 105 as illustrated in FIG. 1C. Including the variable "notifiy.siid.headlines.text" within brackets, "[ ]", may represent that a value stored in update store 122 should be substituted for this variable. If the text of a news headline stored in update store 122 includes the text "Headline Number One", this text may be substituted and displayed on display 105 as illustrated in FIG. 1C. The " " command inserts a space after the text.

Execution of commands may then proceed to line eight. Line eight uses an anchor command, "<a>," to create a link to another HTML document. The "href" attribute associates a URI with the text displayed in line seven. The associated URI is represented by a value included in the "notify.siid.headlines.uri" variable. The associated URI is illustrated by the text "more" on display 105. The text "more" may be highlighted in some manner so as to illustrate that it is a URI. By following the associated URI, a user may be taken directly to more detailed information corresponding to a news headline.

After displaying the first headline, line seven may be executed to display the text "Headline Number Two" and the text "Headline Number Three." Line eight may be executed to associate a URI with each of the headlines. These headlines may be displayed as illustrated in FIG. 1C. At line eleven, an "if" statement similar to that of line two may be executed. If the "if" statement at line eleven returns a TRUE value, which means notifiy.siid.headlines is a non-null value, the unordered list is ended by the "</ul>" command. A horizontal rule line may also be displayed by the "<hr>" command, to separate the headlines from other content on display device 105.

Returning to FIG. 2, static content, references to displayable dynamic content, as well as corresponding layout information may be included in a template file (act 203). This may involve including a variety of different data formats in a file. For example, static content may include graphics and static text, while references to displayable dynamic content include macro extensions to a markup language. In one embodiment, different content formats may be included in a Multipurpose Internet Mail Extensions ("MIME") file.

Mime is a specification for formatting non-ASCII content so it may be transferred over the Internet or other networks. The MIME specification enables graphics, text, video, audio, and other types of media to be compatible combined in a single file. MIME redefines the format of message bodies to allow multi-part textual and non-textual message bodies to be represented and exchanged without loss of information. In the present invention, MIME may be used to specify the file types that are included in a template file.

There are many predefined MIME types of which Graphics Interchange Format ("GIF"), JPEG Image, HTML, and XML are examples. It is also possible to define new MIME types for specific uses. This may include defining MIME types for special extensions to HTML. Web browsers may be configured to support various MIME types. This enables a browser to display or output files that are not in HTML format.

In one embodiment, a multipart MIME file is used to create layout information in the form of an interrelated set of HTML pages. Layout information may include markup language commands, customized extensions to a markup language, graphics, text, and other information that interrelates such content types. It should be understood that combining different content types in a MIME file is merely exemplary. It would be obvious to one skilled in the art, after having reviewed this description, that a wide variety of techniques may be used to combine different content types in a single document.

Including different content types in a template file may be performed at subscription service 125. Alternatively, information delivery service 140 may include different content types in a template file and subscription service 125 accesses these template files. It may also be that telephonic device 100 is capable of including different content types in a template file.

The method in FIG. 2 may also generate computer-executable instructions that facilitate the inclusion of the current state of displayable dynamic content at a display device (act 204). This may include computer-executable instructions that facilitate the substitution of actual updated displayable dynamic content for variables included in a template file. In one embodiment, this may include computer-executable instructions that facilitate merging updated displayable dynamic content stored in update store 122 with layout information 120. Generated computer-executable instructions may be in any of the computer languages previously discussed. Generated computer-executable instructions may be a computer language associated with static content, references to displayable dynamic content, or layout information, or may be in a different computer language.

The method in FIG. 2 may also transfer the template file and computer-executable instructions to a mobile device (act 205). Illustrated in FIG. 1B this may include subscription service 125 transferring a template file and computer-executable instructions to telephonic device 100 via communication link 150. Subscription service 125 may transfer a template file using any of a number of transport protocols well known in the art, for example Wireless Application Protocol ("WAP") download, HyperText Transport Protocol ("HTTP") transfer, Transmission Control Protocol ("TCP"), Internet Protocol ("IP"), or push protocols, such as WAP Push. However, the present invention does not depend on any particular transport protocol. Transferring a template file may include transferring a previously created MIME file that includes static content, references to dynamic content, and layout information. For example, a MIME file may be transferred from subscription service 125 to telephonic device 100. In such an embodiment, computer-executable instructions that facilitate processing of the template file may have been previously stored in telephonic device 100. In alternate embodiments, computer-executable instructions for processing a template file, or for performing other operations, may be transported in conjunction with the template file.

When a MIME file is transferred using WAP Push, an application ID associated with the MIME file may also be transferred. An application ID indicates to a device that a file associated with the application ID is a template file and that the template file may be used to facilitate the display of displayable dynamic content. Application IDs are defined by a particular scheme and devices receiving template files are aware of the scheme.

Devices may change which displayable dynamic content they are registered to receive. If this occurs, a new template file with updated layout information may be transferred to a device. A new template file may overwrite an existing template file or a new template file may be stored in addition to other template files.

During creation and transfer of a template file and computer-executable instructions other parallel actions may occur. For example, subscription service 125 may transfer registrations to service registrations 130 via communication link 151. Service registrations 130 may include a database that stores device registrations and may be accessible to other devices or modules. Service registrations 130 may track which templates have been transferred to a mobile device and which displayable dynamic content a mobile device has registered for.

In one embodiment, information delivery service 140 may access service registrations 130 when it receives updated dynamic data from data providing sources. Data providing sources may be any device or module that is network connectable to information delivery service 140. This may include devices and modules coupled to the Internet or to proprietary content providers, such as a cellular or digital network. Information delivery service 140 may access service registrations 130 to determine devices that are registered to receive updated dynamic data.

Updated dynamic data may be sent to push gateway 140 to be formatted for Over-The-Air ("OTA") transmission. Push gateway 140 may include updated dynamic data items in messages that are sent OTA. Messages may include one or more service indications ("SIs") each of which include a dynamic data item. Dynamic data items may be displayable dynamic content items or layout information items. In alternative embodiments, a single SI may include multiple updated dynamic data items, such as the three headlines as displayed in FIG. 1C. SIs may be stored in update store 122. SIs may include expiration dates that may cause an SI to be removed from update store 122 at a certain time.

In addition to updated displayable dynamic content items and layout information items, a SI may include a URI and a si-id. A URI included in a SI may be used to access a service associated with the SI. For example, it may include the location of an electronic mail program if new electronic mail was received. A si-id may provide a SI with a unique identity that makes it possible to distinguish between different SIs. In the case of transferring updated displayable dynamic content to update store 122, the si-id may include a reference that identifies an element within a previously received template file or corresponding layout information. For example, if an si-id referenced a portion of template file that displayed updated headlines, the si-id may have a value of 'headlines' which is referenced by the template file as "notify.siid.headlines". Through a reference to a si-id, a template file may access displayable dynamic content in update store 122 and merge the displayable dynamic content with a template file. Newly stored SIs that include a si-id identical to a SI previously stored in update store 122 may be used to overwrite content items.

Figure 3:
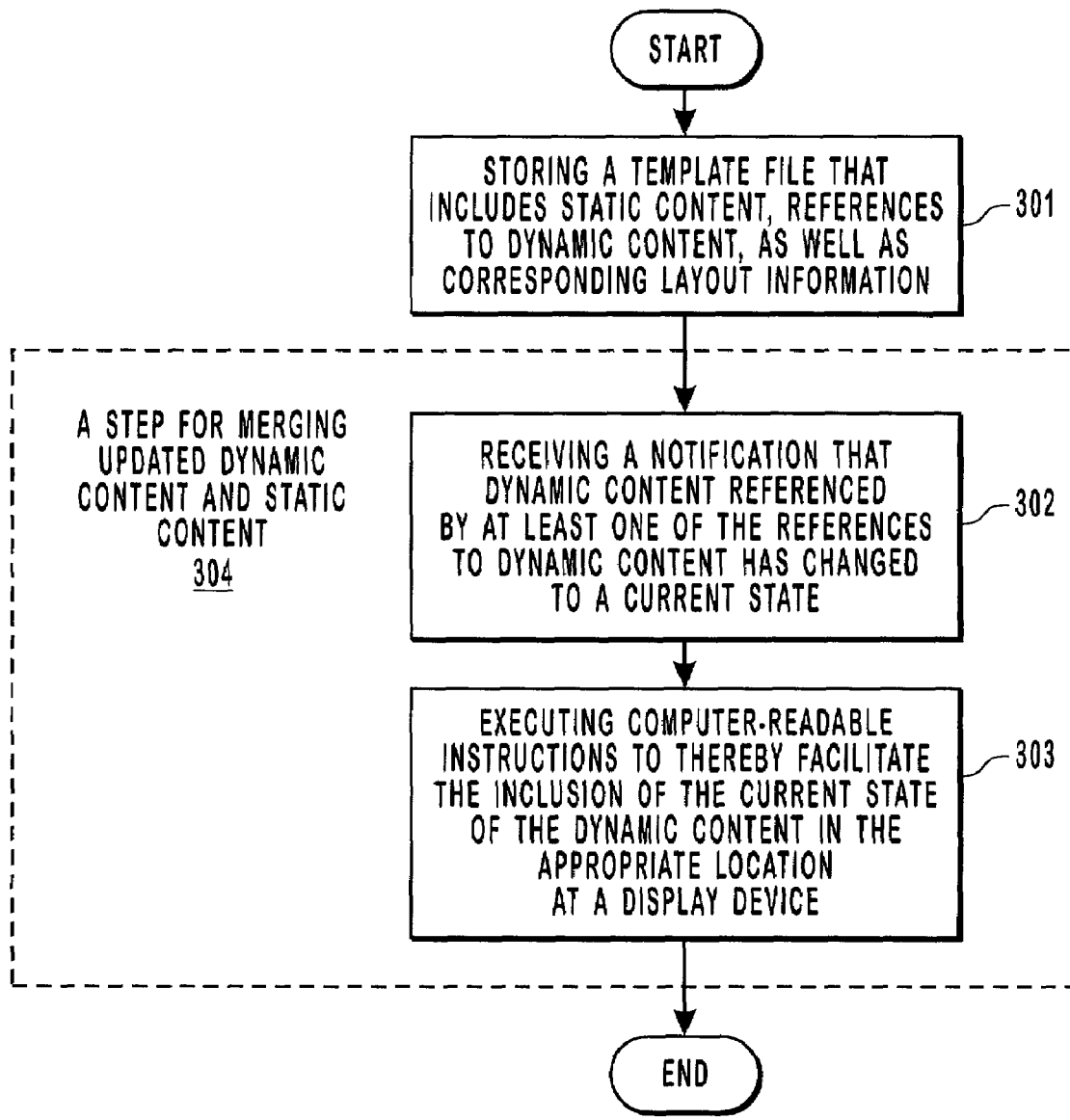
FIG. 3 is a flow diagram illustrating an example of a method for automatically displaying dynamic data on the display of a mobile device.

Displayable dynamic content items stored in update store 122 may be automatically displayed on display 105. FIG. 3 is a flow diagram illustrating an example of a method for automatically displaying content on the display of a mobile device. The method in FIG. 3 will be described with reference to the functional components and modules described in FIGS. 1A and 1B.

The method illustrated in FIG. 3 may include an act of storing a template file that includes, static content, references to displayable dynamic content, as well as corresponding layout information (act 301). Template files may include any of the content types described above in the discussion of FIG. 2. Template files may be stored in memory 112 and portions may be included in application programs 114 and/or program modules 115 and/or program data 116.

The method in FIG. 3 may perform a step for merging updated displayable dynamic content and static content (step 304). This may include performing the acts of receiving a notification that displayable dynamic content has changed to a current state (act 302) and executing computer-executable instructions to facilitate display of the current state of displayable dynamic content (act 303).

Notification that displayable dynamic content has changed may be received in any of a number of protocols or formats well known in the art. In one embodiment, notification may include receiving a SI that was sent over WAP and that includes updated displayable dynamic content items. When a notification is sent over WAP, it may employ the WAP Push Over The Air Protocol. A user may receive notification in the form of an audio tone output at speaker 104 or text displayed on display 105. In alternate embodiments, notification may be received in the form of structured data content types other than an SI and notifications may be transferred to a mobile device using protocols other than WAP. For example, structured data content types may be created that include multiple displayable dynamic content items, yet do not include a URI associated with the displayable dynamic content. Structured data content types may be user defined MIME file types. Notifications may be transferred via any of the previously described transport protocols.

Facilitating display of the current state of displayable dynamic content may include causing the execution of macro extensions included in a template file. Executing macro extensions may cause the update store to be searched for displayable dynamic content items corresponding to the macro extensions. If displayable dynamic content items corresponding to macro extensions are located, in update store 122 they may be joined with static content included in a template file. In some embodiments, a customized browser may be used to facilitate execution of macro extensions and facilitate joining displayable dynamic content items stored in update store 122 with static content. Displayable dynamic content may be automatically displayed on a display device, for example, display 105, without any actions being performed by a user. Likewise, currently displayed dynamic content may be refreshed without any actions being performed by a user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired to be secured by United States Letters Patent is:

1. A method of customizing arrangement of content displayed on a display device of a mobile computing device, the method comprising:
   an act of creating a template file at a network computing device, which represents a layout for displaying content at the mobile computing device that is updated automatically and without user intervention, by performing the acts of:
      generating static content and layout information corresponding to the static content;
      generating one or more references to dynamic content and layout information corresponding to the one or more references to dynamic content, the dynamic content changing over time; and
      including the static content, the one or more references to the dynamic content, as well as corresponding layout information in the template file;
   an act of generating computer-executable instructions for substituting the dynamic content at the mobile computing device, the substituted dynamic content being stored separate from the template file and substituted for the one or more references to the dynamic content included in the template file;
   an act of transferring the template file and the computer-executable instructions to the mobile computing device in order to customize arrangement of the dynamic content at the mobile computing device wherein the computer-executable instructions are executed at the mobile computing device to facilitate merging updated displayable dynamic content at the mobile computing device with the layout information corresponding to the one or more references to dynamic content, wherein the template file, including the layout information is stored at the mobile computing device; and an act of monitoring content denoted in a registration and when dynamic content of interest changes, transporting the dynamic content to the mobile computing device where the transported dynamic content is merged with the layout information corresponding to the one or more references to dynamic content.

2. The method as recited in claim 1, wherein generating static content and layout information corresponding to the static content comprises the following:

an act of generating computer-executable instructions in the form of markup language instructions.

3. The method as recited in claim 2, wherein generating computer-executable instructions in the form of markup language instructions comprises the following:

an act of generating computer-executable instructions in the form of HTML instructions.

4. The method as recited in claim 1, wherein generating static content and layout information corresponding to the static content comprises the following:

an act of generating layout information for positioning static content on the display device.

5. The method as recited in claim 1, wherein generating references to dynamic content and layout information corresponding to the references to dynamic content comprises the following:

an act of generating customized extensions to a computer language, the customized extensions referencing dynamic content.

6. The method as recited in claim 5, wherein generating customized extensions to a computer language comprises the following:

an act of generating customized extensions to a markup language, the extensions referencing dynamic content.

7. The method a recited in claim 6, wherein generating customized extensions to a markup language comprises the following:

an act of generating customized macro extensions to a markup language, the customized macro extensions referencing dynamic content.

8. The method as recited in claim 7, wherein generating customized macro extensions to a markup language comprises the following:

an act of generating customized macro extensions to HTML, the customized macro extensions referencing dynamic content.

9. The method as recited in claim 8, wherein generating customized macro extensions to HTML comprises the following:

an act of generating customized macro extensions that may cause the display of dynamic content at the display device.

10. The method as recited in claim 5, wherein generating customized extensions to a computer language comprises the following:

an act of generating customized extensions to a computer language that may, automatically and without user intervention, cause the display of dynamic content at the display device.

11. The method as recited in claim 5, wherein generating customized extensions to a computer language comprises the following:

an act of generating customized extensions to a script language, the extensions referencing dynamic content.

12. The method as recited in claim 11, wherein generating customized extensions to a script language, the extensions referencing dynamic content comprises the following:

an act of generating customized extensions to java script, the extensions referencing dynamic content.

13. The method as recited in claim 1, wherein generating references to dynamic content and layout information corresponding to the references to dynamic content comprises the following:

an act of generating layout information for positioning dynamic content on the display device.

14. The method as recited in claim 1, wherein generating references to dynamic content and layout information corresponding to the references to dynamic content comprises the following:

an act of generating layout information for ordering dynamic content on the display device.

15. The method as recited in claim 1, wherein including the static content, the references to the dynamic content, as well as corresponding layout information in a template file comprises the following:

an act of including the static content, the references to dynamic content, as well as corresponding layout information in a template file that is capable of including content of a plurality of different formats.

16. The method as recited in claim 15, wherein including the static content, the references to dynamic content, as well as corresponding layout information in a template file that is capable of including content of a plurality of different formats comprises the following:

an act of including the static content, the references to dynamic content, as well as corresponding layout information in a MIME file.

17. The method as recited in claim 1, wherein generating computer-executable instructions comprises the following:

an act of generating computer-executable instructions in a markup language for substituting, at the mobile computing device, the dynamic content for the one or more references to the dynamic content.

18. The method as recited in claim 17, wherein generating computer-executable instructions in a markup language comprises:

an act of generating computer-executable instructions in HTML.

19. The method as recited in claim 18, wherein generating computer-executable instructions in HTML comprises the following:

an act of generating computer-executable instructions that include customized macro extensions to HTML.

20. The method as recited in claim 1, wherein transferring the template file and the computer-executable instructions to the mobile device comprises the following:

an act of transferring a template file that includes content encoded in a MIME format to the mobile device.

21. The method as recited in claim 20, wherein transferring a template file that includes content encoded in a MIME format to the mobile device comprises the following:

an act of transferring a template file that includes content encoded in a MIME format to the mobile device using WAP.

22. The method as recited in claim 21, wherein transferring a template file that includes content encoded in a MIME format to the mobile device using WAP comprises the following:

an act of transferring a template file, that includes content encoded in a MIME format and that is associated with a specific application id, to the mobile device using WAP.

23. The method as recited in claim 22, wherein transferring a template file, that includes content encoded in a MIME format and that is associated with a specific application id, to the mobile device using WAP comprises the following:

an act of transferring a template file, that includes content encoded in a MIME format and that is associated with a specific application id that identifies the template file as including content encoded in a MIME format, to the mobile device using WAP.

24. The method as recited in claim 1, wherein transferring the template file and the computer-executable instructions to the mobile device comprises the following:

an act of transferring a template file and computer-executable instructions that include HTML content.

25. The method as recited in claim 1, wherein transferring the template file and the computer-executable instructions to the mobile device comprises the following:

an act of transferring the template file and the computer-executable instructions via a transport protocol.

26. The method as recited in claim 25, wherein transferring the template file and the computer-executable instructions via a transport protocol comprises the following:

an act of transferring the template file and the computer-executable instructions via HyperText Transport Protocol.

27. A method for displaying a customized arrangement of content at a mobile computing device, the method comprising:

an act of receiving, from a network computing device, a template file that includes static content, one or more references to dynamic content, as well as corresponding layout information for the static and dynamic content;

storing the template file and the layout information;

an act of receiving, from the network computing device, computer-executable instructions for substituting the dynamic content for the one or more references to the dynamic content included in the template file;

an act of receiving a notification that dynamic content referenced by at least one of the one or more references to the dynamic content has changed as a result of the network computing device monitoring content denoted in a registration such that when dynamic content of interest changes, the dynamic content is transported to the mobile computing device where the transported dynamic content is merged with the layout information corresponding to the one or more references to dynamic content;

an act of executing computer-executable instructions to substitute the changed dynamic content at the mobile computing device, the changed dynamic content being stored separate from the template file and substituted for the at least one of the one or more references to the dynamic content, based on the notification that the dynamic content referenced by the at least one of the one or more references to the dynamic content has changed, wherein the computer-executable instructions are executed at the mobile computing device to facilitate merging updated displayable dynamic content at the mobile computing device with the layout information corresponding to the one or more references to dynamic content.

28. The method as recited in claim 27, further comprising the following:

an act of storing the template file in system memory associated with the mobile computing device.

29. The method as recited in claim 27, wherein receiving a notification that dynamic content referenced by at least one of the one or more references to dynamic content has changed comprises the following:

an act of receiving a notification that was pushed to the mobile device using a wireless protocol.

30. The method as recited in claim 29, wherein receiving a notification that was pushed to the mobile device using a wireless protocol comprises:

an act of receiving a notification that was pushed to the mobile device using WAP.

31. The method as recited in claim 30, wherein receiving a notification that was pushed to the mobile device using WAP comprises:

an act of receiving a service indication element that was pushed to the mobile device using WAP.

32. The method as recited in claim 31, wherein receiving a service indication element that was pushed to the mobile device using WAP comprises the following:

an act of receiving a service indication element that includes a URI.

33. The method as recited in claim 31, wherein receiving a service indication element that was pushed to the mobile device using WAP comprises the following:

an act of receiving a service indication element, which includes a system indication ID that identifies a reference to dynamic content included in a template file.

34. The method as recited in claim 31, wherein receiving a service indication element that was pushed to the mobile device using WAP comprises the following:

an act of receiving a service indication element that includes dynamic content that has changed.

35. The method as recited in claim 27, wherein receiving a notification that dynamic content referenced by at least one of the one or more references to dynamic content has changed comprises the following:

an act of receiving a notification via a transport protocol that dynamic content referenced by at least one of the one or more references to dynamic content has changed.

36. The method as recited in claim 27, wherein receiving a notification that dynamic content referenced by at least one of the one or more references to dynamic content has changed comprises the following:

an act of receiving a notification, which includes a plurality of dynamic content items associated with a structured data content type, that dynamic content referenced by at least one of the one or more references to dynamic content has changed.

37. The method as recited in claim 27, wherein receiving a notification that dynamic content referenced by at least one of the one or more references to dynamic content has changed comprises the following:

an act of storing a notification that was pushed to the mobile device using a wireless protocol.

38. The method as recited in claim 27, wherein an act of executing computer-executable instructions comprises the following:

an act of executing markup language instructions.

39. The method as recited in claim 38, wherein an act of executing markup language instructions comprises the following:
   an act of executing HTML instructions.

40. A computer program product comprising one or more computer readable media with computer executable instructions for implementing a method of customizing arrangement of content displayed on a display device of a mobile computing device, the method comprising:
   creating a template file at a network computing device, which represents a layout for displaying content at the mobile computing device that is updated automatically and without user intervention, by:
      generating static content and layout information corresponding to the static content;
      generating one or more references to dynamic content and layout information corresponding to the one or more references to dynamic content, the dynamic content changing over time even if corresponding layout information remains the same;
      including the static content, the one or more references to the dynamic content, as well as corresponding layout information in the template file;
   generating computer-executable instructions for substituting the dynamic content at the mobile computing device, the substituted dynamic content being stored separate from the template file and substituted for the one or more references to the dynamic content included in the template file; wherein the computer-executable instructions are executed at the mobile computing device to facilitate merging updated displayable dynamic content at the mobile computing device with the layout information corresponding to the one or more references to dynamic content;
   transferring the template file and the computer-executable instructions to the mobile computing device in order to customize arrangement of the dynamic content at the mobile computer device, wherein the template file, including the layout information is stored at the mobile computing device; and
   monitoring content denoted in a registration and when dynamic content of interest changes, transporting the dynamic content to the mobile computing device where the transported dynamic content is merged with the layout information corresponding to the one or more references to dynamic content.

41. The computer program product as recited in claim 40, wherein the computer-readable medium is a physical storage media.

42. A computer program product comprising one or more computer readable media with computer executable instructions for implementing a method of displaying a customized arrangement of content at a mobile computing device, the method comprising:
   receiving, from a network computing device, a template file that includes static content, one or more references to dynamic content, as well as corresponding layout information for the static and dynamic content;
   receiving, from the network computing device, computer-executable instructions for substituting the dynamic content for the one or more references to the dynamic content included in the template file;
   receiving a notification that dynamic content referenced by at least one of the one or more references to the dynamic content has changed as a result of the network computing device monitoring content denoted in a registration such that when dynamic content of interest changes, the dynamic content is transported to the mobile computing device where the transported dynamic content is merged with the layout information corresponding to the one or more references to dynamic content;
   executing computer-executable instructions to substitute the changed dynamic content at the mobile computing device, the changed dynamic content being stored separate from the template file and substituted for the at least one of the one or more references to the dynamic content, based on the notification that the dynamic content referenced by the at least one of the one or more references to the dynamic content has changed, wherein the computer-executable instructions are executed at the mobile computing device to facilitate merging updated displayable dynamic content at the mobile computing device with the layout information corresponding to the one or more references to dynamic content.

43. The computer program product as recited claim 42, wherein the computer-readable medium is memory included in the mobile computing device.

44. A method as recited in claim 1, wherein the method further includes generating at least some dynamic content at the mobile computing device that replaces one or more references provided in the template file.

45. A method as recited in claim 1, wherein the method further includes notifying the mobile computing device of changes to the layout information and other dynamic content.

46. A method as recited in claim 45, wherein notifying includes providing an audio notification.

47. A method as recited in claim 27, wherein the method further includes generating at least some dynamic content at the mobile computing device that replaces one or more references provided in the template file.

48. A method as recited in claim 27, wherein the notification includes an audio notification.

* * * * *